United States Patent
Qiu

(10) Patent No.: US 11,575,292 B2
(45) Date of Patent: Feb. 7, 2023

(54) ANTI-ROTATION DEVICE FOR ROTOR BEARINGS IN GENERATORS

(71) Applicant: Hamilton Sundstrand Corporation, Charlotte, NC (US)

(72) Inventor: Liangheng Qiu, Prairie Grove, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 525 days.

(21) Appl. No.: 16/657,015

(22) Filed: Oct. 18, 2019

(65) Prior Publication Data
US 2021/0119510 A1  Apr. 22, 2021

(51) Int. Cl.
*H02K 7/08* (2006.01)
*F16C 35/067* (2006.01)

(52) U.S. Cl.
CPC ............. *H02K 7/08* (2013.01); *F16C 35/067* (2013.01); *F16C 2204/60* (2013.01); *F16C 2226/16* (2013.01); *F16C 2380/26* (2013.01)

(58) Field of Classification Search
CPC ...... H02K 7/08; H02K 5/1732; F16C 35/067; F16C 2204/60; F16C 2226/16; F16C 2380/26; F16C 35/077
USPC .......................................................... 310/90
See application file for complete search history.

(56) References Cited

U.S. PATENT DOCUMENTS

| 2,397,703 | A | | 4/1946 | Stallman |
| 3,730,599 | A | | 5/1973 | Fingerle |
| 3,750,902 | A | | 8/1973 | Starrett |
| 4,652,167 | A | * | 3/1987 | Garman ............... F16C 11/045 403/162 |
| 2009/0085421 | A1 | * | 4/2009 | Saito ..................... H02K 3/12 310/214 |
| 2017/0159714 | A1 | | 6/2017 | Lemmers, Jr. et al. |
| 2019/0153896 | A1 | | 5/2019 | Ganiger et al. |

FOREIGN PATENT DOCUMENTS

| DE | 880235 C | 6/1953 |
| EP | 2093439 A1 | 8/2009 |
| JP | S62196423 A | 8/1987 |
| WO | WO-2016168102 A1 * | 10/2016 ............. F01D 25/16 |

OTHER PUBLICATIONS

Extended European search report issued in corresponding EP application No. 19215287.4, dated Jul. 30, 2020.

* cited by examiner

*Primary Examiner* — Terrance L Kenerly
(74) *Attorney, Agent, or Firm* — Locke Lord LLP; Joshua L. Jones; Gabrielle L. Gelozin

(57) ABSTRACT

An anti-rotation device including a tapered sleeve elongated along a longitudinal axis wherein the sleeve including an inner surface defining an inner diameter, an outer surface defining an outer diameter varying along the longitudinal axis, a slot extended from the inner surface to the outer surface configured to provide.

15 Claims, 2 Drawing Sheets

ANTI-ROTATION DEVICE FOR ROTOR BEARINGS IN GENERATORS

BACKGROUND

Technological Field

The present disclosure relates to a generator bearing system, and more particularly to altering generator rotor bearing clearance between the bearing outer race and the bearing supporter bore.

Description of Related Art

Rotor ball bearings in generators typically include clearance between the bearing outer race and the support bore. This clearance can increase rotating load, reduce support stiffness, and add misalignment to the bearings. A variety of known devices are employed to reduce bearing outer race fit clearance.

The conventional methods and systems have generally been considered satisfactory for their intended purpose. However, there is still a need in the art for a device having improved retention properties. There also remains a need in the art for such devices and components that are economically viable. The present disclosure may provide a solution for at least one of these remaining challenges.

SUMMARY

An anti-rotation device includes a tapered sleeve elongated along a longitudinal axis wherein the sleeve includes an inner surface defining an inner diameter, an outer surface defining an outer diameter varying along the longitudinal axis, and a slot extended from the inner surface to the outer surface configured to provide flexibility to compress the sleeve to reduce the outer diameter during installation. The inner diameter can be constant along the longitudinal axis and the outer diameter can decrease from a front face of the sleeve to a rear face of the sleeve that is opposed to the front face. The slot can extend from a front face of the sleeve to a rear face of the sleeve. The slot defines a constant width along a length thereof. The tapered sleeve defines a constant decreasing thickness between the inner diameter and the outer diameter along a length thereof. The slot can include a first face spaced apart from a second face across a gap. An angle between the outer diameter and the inner diameter of the sleeve can be between 5 degrees and 10 degrees inclusive.

The anti-rotation device can be used in an electrical generator including a rotor, a rotating shaft fixed to the rotor, a rotor ball bearing including an inner race and an outer race affixed to the rotating shaft, a bearing support enclosing the rotor ball bearing, a clearance between the outer race of the rotor ball bearing and the support bore in order to decrease eccentricity of the rotating load. The anti-rotation device can be oriented closer to the rotor than the thinner portion. A spring and a locking plate can secure the anti-rotation device within the clearance from a side proximate to the rotor. The anti-rotation device can include a material different from the rotor ball bearing outer race and the anti-rotation device can include steel. The anti-rotation device can be the same material as the bearing support.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
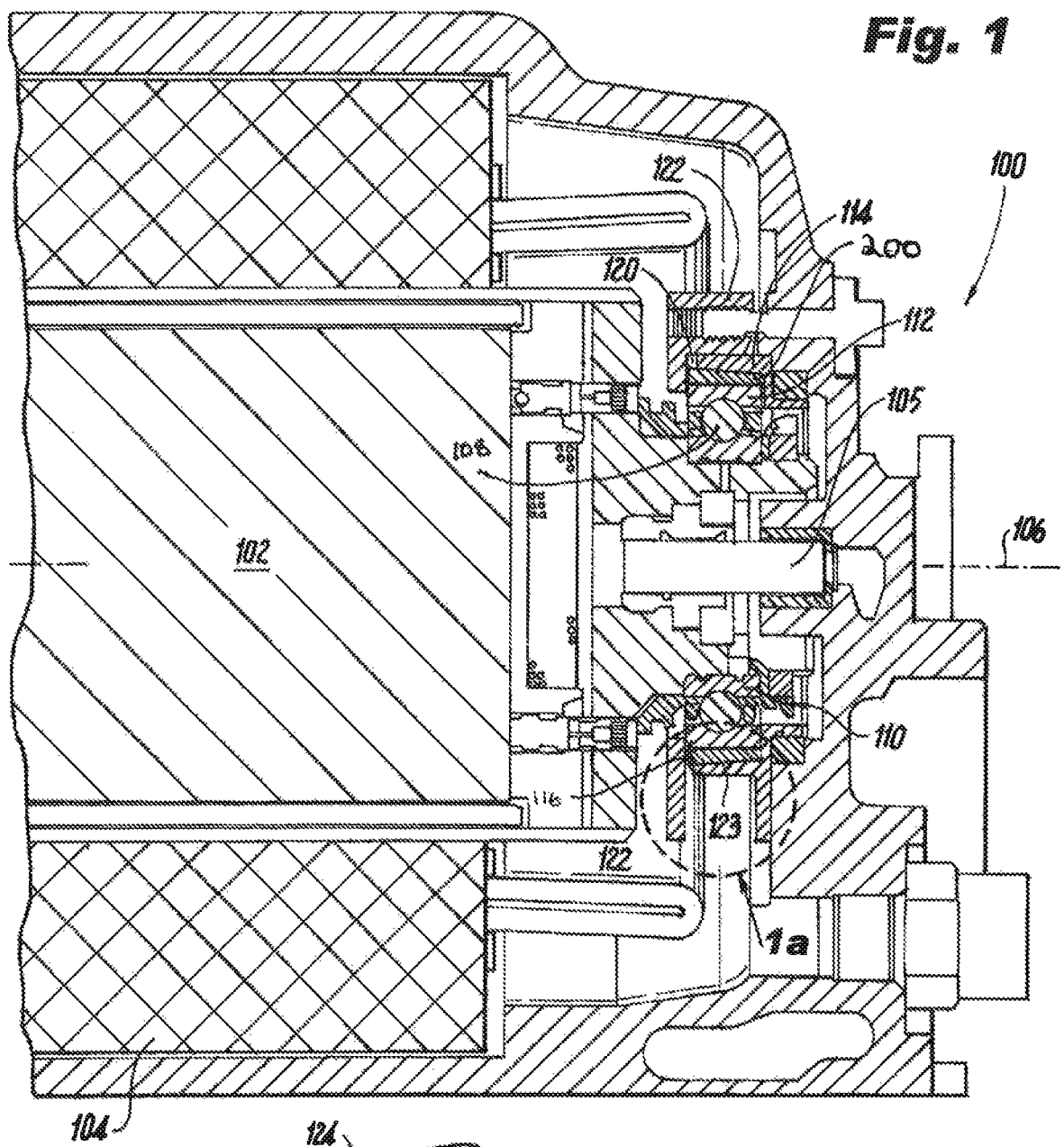
FIG. 1 is a side view of a generator including an anti-rotation device.
Figure 1A:
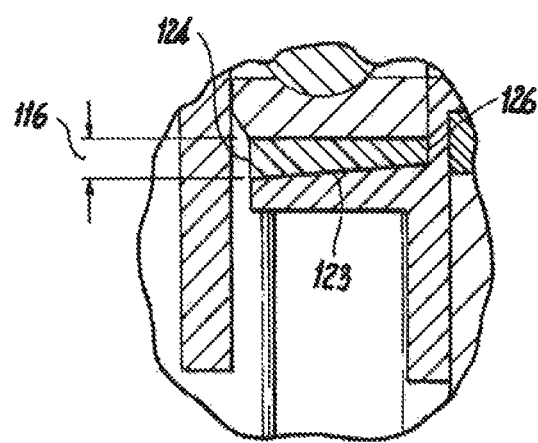
FIG. 1a is an enlarged view of a portion of FIG. 1, showing the anti-rotation device.

Reference will now be made to the drawings wherein like reference numerals identify similar structural features or aspects of the subject disclosure. For purposes of explanation and illustration, and not limitation, a partial view of an exemplary embodiment of a generator including an anti-rotation device in accordance with the disclosure is shown in FIG. 1 and is designated generally by reference character 100. Other embodiments of the anti-rotation device in accordance with the disclosure, or aspects thereof, are provided in FIGS. 2a-2c will be described. The methods and systems of the disclosure can be used to reduce a clearance, and reduce loads and misalignment risks.

FIG. 1 shows an integrated drive electrical generator 100 having a rotor 102 and stator 104 defining a longitudinal axis 106. A rotating shaft 105 is fixed to the rotor 102. A ball bearing 108 including an inner race 110 and an outer race 112 is affixed to the rotating shaft. A bearing support 114 encloses the ball bearing races 110, 112 from a side opposite the rotor 102. A clearance 116 exists between the outer race 112 and the bearing support 114. This clearance 116 is fitted with an anti-rotation device 200 in order to decrease eccentricity of the rotating loads on the shaft 106 and bearings 108. A spring 120 and a locking plate 122 secure the anti-rotation device 118 within the clearance 116 from a side proximate to the rotor 102. The anti-rotation device 118 includes a tapered outer surface 123, wherein a wider portion 124 of the anti-rotation 118 device is oriented closer to the rotor 102 than the thinner portion 126.

The anti-rotation device 118 can include steel or another comparable alloy. The anti-rotation device 118 includes a material different from the rotor ball bearing outer race 112, allowing the anti-rotation device to react properly during the clearance change due to heat fluctuations. The anti-rotation device 118 can include the same material as the bearing support 114. Introducing the anti-rotation sleeve eliminates the clearance and improves rotor bearing performance and generator reliability.

Figure 2A:
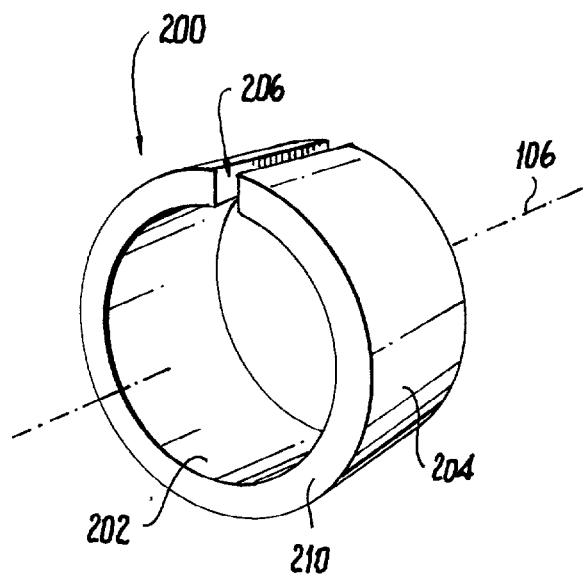
FIG. 2a is a perspective view of the anti-rotation device of FIG. 1, showing the front face and the slot.
Figure 2B:
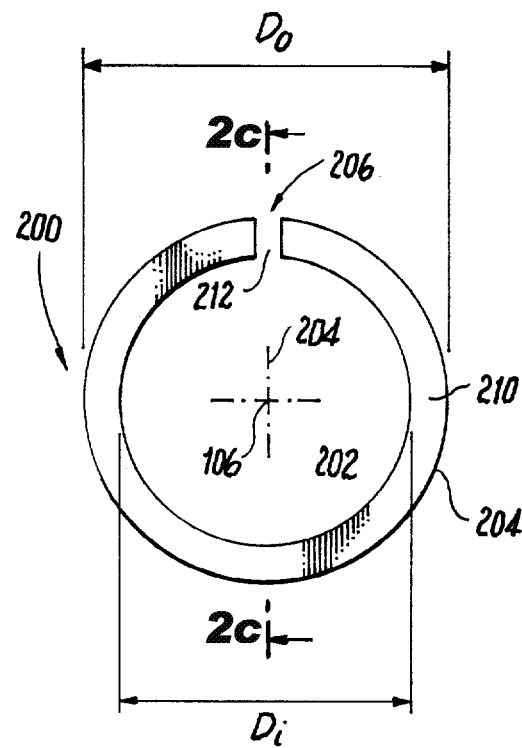
FIG. 2b is a front view of the anti-rotation device of FIG. 1, showing the front face and the slot.
Figure 2C:
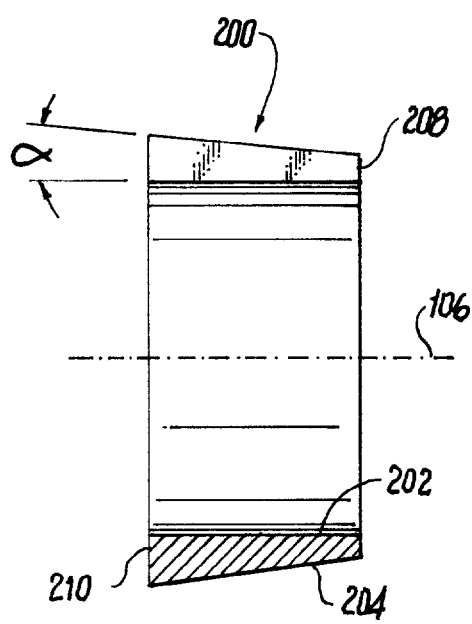
FIG. 2c is a side view of the anti-rotation device of FIG. 1, showing the slope of the outer diameter.

FIG. 2a-2c shows a detailed view of the anti-rotation device 118. The anti-rotation device 200 includes a tapered anti-rotation device elongated along the longitudinal axis 106. The anti-rotation device 200 includes a smooth inner surface 202 defining an inner diameter (Di) and a smooth outer surface 204 defining an outer diameter (Do) which is constantly decreasing along the longitudinal axis 106. The anti-rotation device 200 further includes an opening or slot 206 for providing flexibility during installation. The slot 206 extends all the way from the inner surface 202 to the outer surface 204.

The inner diameter (Di) is constant along the longitudinal axis. The outer diameter (Do) is sloped at approximately 5%-10% and decreases from a front face 210 of the anti-rotation device 200 to a rear face 208 of the anti-rotation device 200.

The slot 206 extends from the front face 210 to the rear face 208 and defines a constant width (w). The slot includes a first face 212 spaced apart from a second face 214 across the constant slot, wherein the faces 212, 214 are both smooth.

The methods and systems of the present disclosure, as described above and shown in the drawings, provide for anti-rotation device with superior properties including increased reliability and stability, and reduced size, weight, complexity. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. An anti-rotation device comprising:
 a tapered sleeve defining a longitudinal axis wherein the sleeve includes:
 an inner surface defining an inner diameter;
 an outer surface defining an outer diameter varying along the longitudinal axis; and
 a slot extended from the inner surface to the outer surface configured to provide flexibility to compress the sleeve to reduce the outer diameter during installation, wherein the slot extends for an entire axial length of the sleeve and through at least the front face of the sleeve.

2. The device of claim 1, wherein the inner diameter is constant along the longitudinal axis.

3. The device of claim 1, wherein the outer diameter decreases from a first axial face of the sleeve to a second axial face of the sleeve that is opposed to the first axial face.

4. The device of claim 1, wherein the slot defines a constant width along a length thereof.

5. The device of claim 1, wherein the outer surface is frustoconical.

6. The device of claim 1, wherein the slot includes a first face spaced apart from a second face across a gap.

7. The device of claim 1, wherein an angle between the outer diameter and the inner diameter of the sleeve is between 5 degrees and 10 degrees inclusive.

8. An electrical generator comprising:
 a rotor defining a longitudinal axis;
 a rotating shaft fixed to the rotor;
 a rotor ball bearing including an inner race affixed to the rotating shaft and an outer race;
 a bearing support enclosing the rotor ball bearing such that a clearance exists between the outer race of the rotor ball bearing and a support bore; and
 an anti-rotation device located within the clearance in order to decrease possible eccentricity of a rotating load, wherein the anti-rotation device includes:
 a tapered sleeve defining a longitudinal axis, the sleeve including:
 an inner surface defining an inner diameter;
 an outer surface defining an outer diameter varying along the longitudinal axis; and
 a slot extended from the inner surface to the outer surface configured to provide flexibility to compress the sleeve to reduce the outer diameter during installation, wherein the slot extends for an entire axial length of the sleeve and through at least the front face of the sleeve.

9. The electrical generator of claim 8, wherein the anti-rotation device includes a tapered outer surface.

10. The electrical generator of claim 8, wherein a wider portion of the anti-rotation device is oriented closer to the rotor than the thinner portion.

11. The electrical generator of claim 8, wherein a spring and a locking plate secure the anti-rotation device within the clearance from a side proximate to the rotor.

12. The electrical generator of claim 8, wherein the anti-rotation device includes a material different from the rotor ball bearing outer race.

13. The electrical generator of claim 8, wherein the anti-rotation device includes steel.

14. The electrical generator of claim 8, wherein the anti-rotation device is the same material as the bearing support.

15. The electrical generator of claim 8, wherein the generator is an integrated drive generator.

* * * * *